United States Patent
Vance et al.

(10) Patent No.: US 7,526,326 B2
(45) Date of Patent: Apr. 28, 2009

(54) HANDHELD WIRELESS COMMUNICATORS WITH REDUCED FREE-SPACE, NEAR-FIELD EMISSIONS

(75) Inventors: Scott LaDell Vance, Lund (SE); Gerard James Hayes, Wake Forest, NC (US)

(73) Assignee: Sony Ericsson Mobile Communications AB (SE)

( * ) Notice: Subject to any disclaimer, the term of this patent is extended or adjusted under 35 U.S.C. 154(b) by 658 days.

(21) Appl. No.: 11/128,652

(22) Filed: May 13, 2005

(65) Prior Publication Data
US 2006/0258414 A1 Nov. 16, 2006

(51) Int. Cl.
*H04M 1/00* (2006.01)

(52) U.S. Cl. ............. 455/575.7; 455/575.1; 455/575.3; 455/575.4; 455/575.5; 455/90.3; 455/347; 343/700 MS; 343/702; 379/433.01; 379/433.11; 379/433.12; 379/433.13; 379/440

(58) Field of Classification Search .......... 455/569.1–2, 455/575.1, 575.3–4, 575.5, 575.7, 90.3, 347–350; 343/700 MS, 702; 379/433.01, 433.11, 433.12, 379/433.13, 440
See application file for complete search history.

(56) References Cited

U.S. PATENT DOCUMENTS

| | | | | |
|---|---|---|---|---|
| 6,959,210 B2 * | 10/2005 | Nakamura | ............... | 455/575.3 |
| 7,027,838 B2 * | 4/2006 | Zhou et al. | ................ | 455/562.1 |
| 7,099,632 B2 * | 8/2006 | Hong et al. | ................ | 455/90.3 |
| 7,136,681 B2 * | 11/2006 | Sadler et al. | ............. | 455/575.1 |
| 7,346,376 B2 * | 3/2008 | Hamamura et al. | ...... | 455/575.3 |
| 2004/0023682 A1 * | 2/2004 | Lee et al. | ................. | 455/550.1 |
| 2004/0046701 A1 * | 3/2004 | Huber et al. | ................ | 343/702 |
| 2004/0203529 A1 | 10/2004 | Hong et al. | | |
| 2006/0142072 A1 * | 6/2006 | Krenz et al. | ............. | 455/575.3 |

FOREIGN PATENT DOCUMENTS

| | | |
|---|---|---|
| EP | 1 351 334 | 10/2003 |
| JP | 2003-388099 | 11/2003 |

OTHER PUBLICATIONS

International Search Report and Written Opinion of the International Searching Authority for International Patent Application No. PCT/US2005/041988 mailed on Mar. 28, 2006.
Vance, *Tunable Parasitic Resonators*, U.S. Appl. No. 10/864,761, filed Oct. 14, 2003.

* cited by examiner

*Primary Examiner*—Tuan A Tran
(74) *Attorney, Agent, or Firm*—Myers Bigel Sibley & Sajovec, P.A.

(57) ABSTRACT

Stick, clamshell, jackknife and slider configurations are provided for handheld wireless communicators with reduced free-space, near-field emissions that can be hearing aid compatible using two ground planes and a reactive matching element along with predefined placement of an antenna, speaker and/or microphone in the communicator housing.

19 Claims, 13 Drawing Sheets

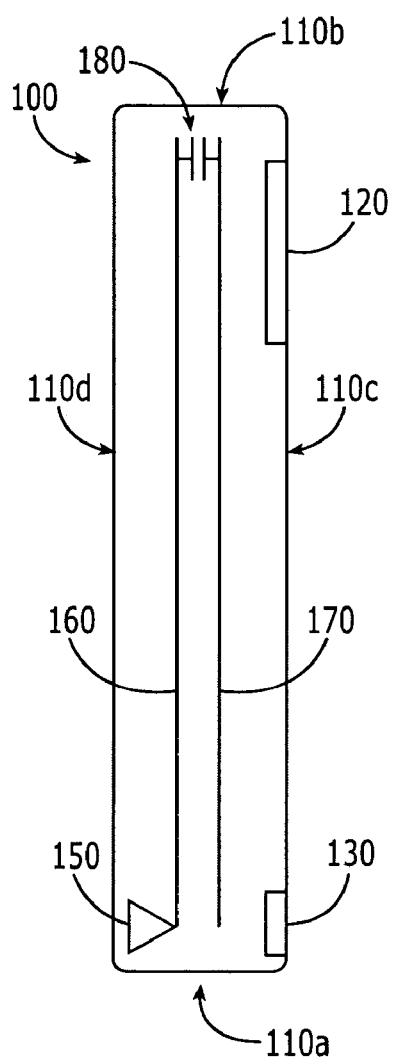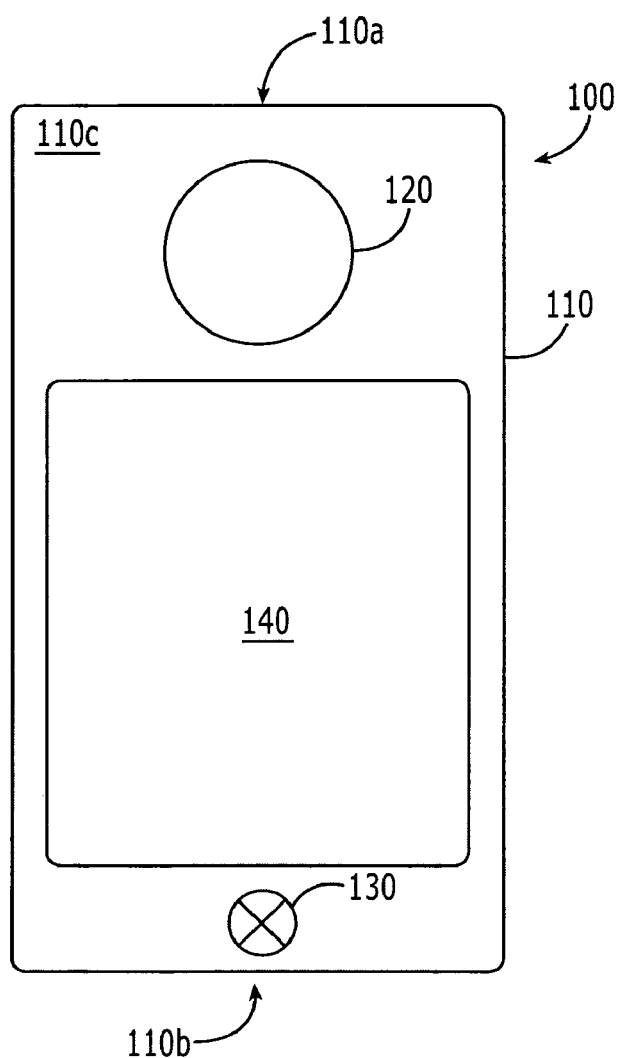
FIG. 1A
FIG. 1B no match 6.8 pF match 5.6 pF match

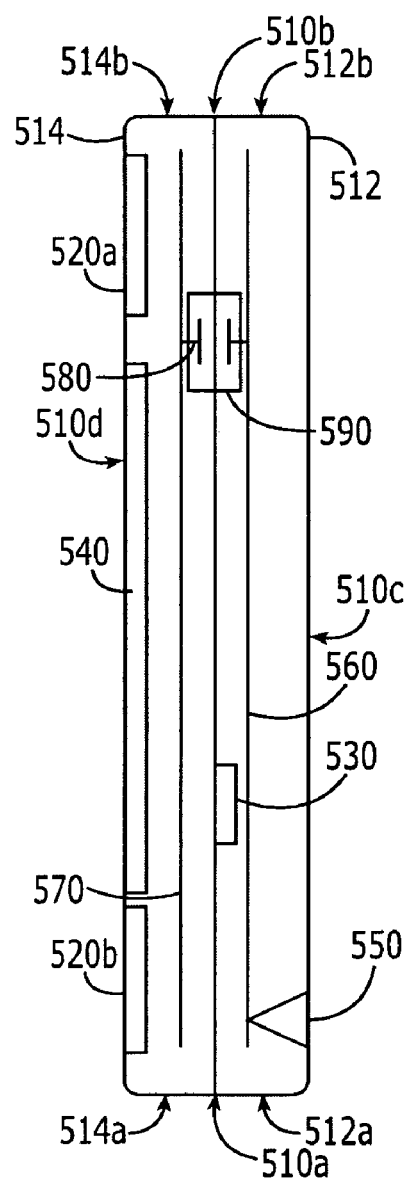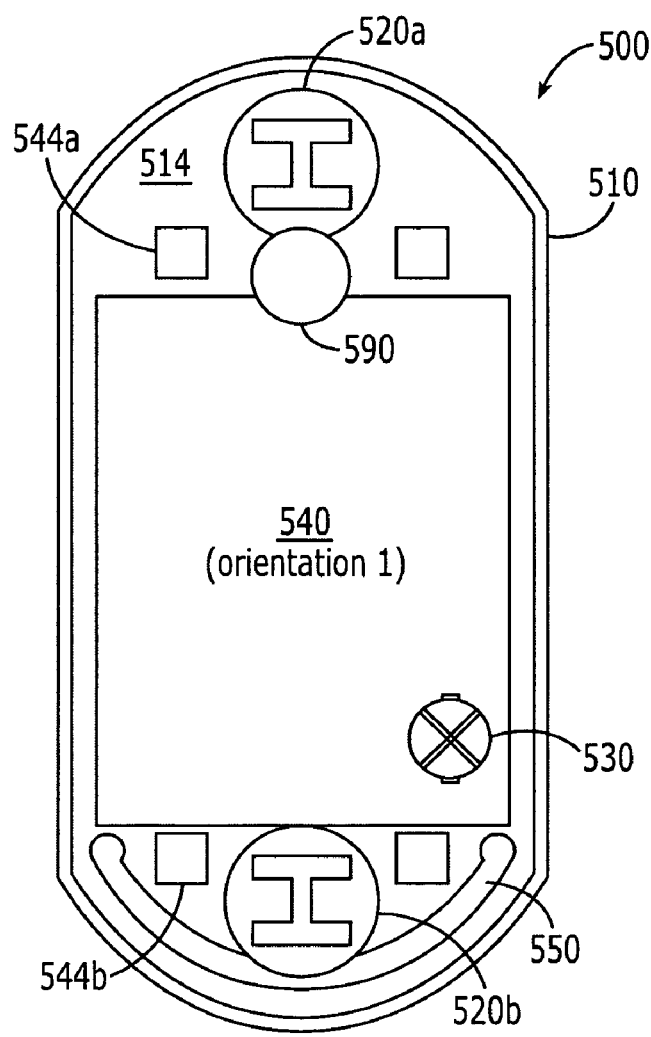
FIG. 5A
FIG. 5B

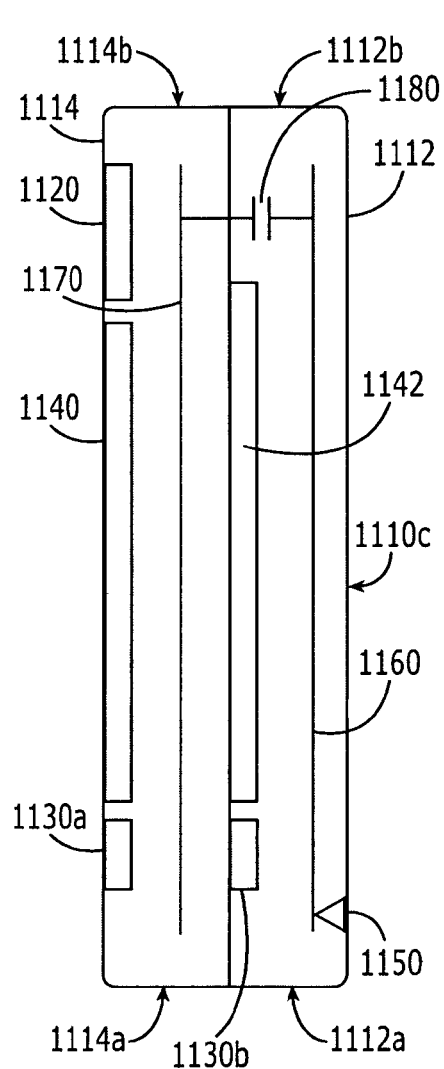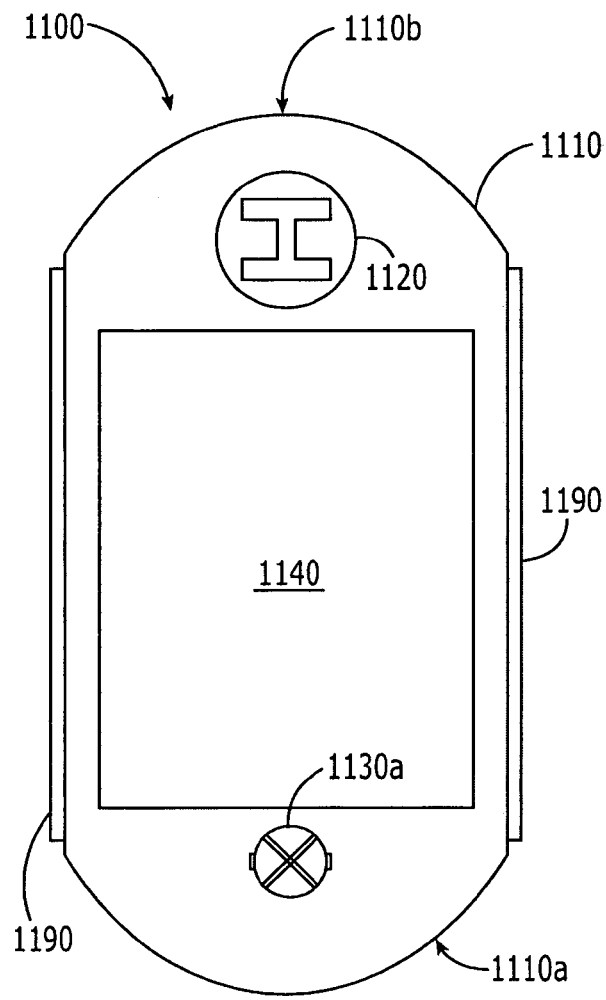
FIG. 11A
FIG. 11B

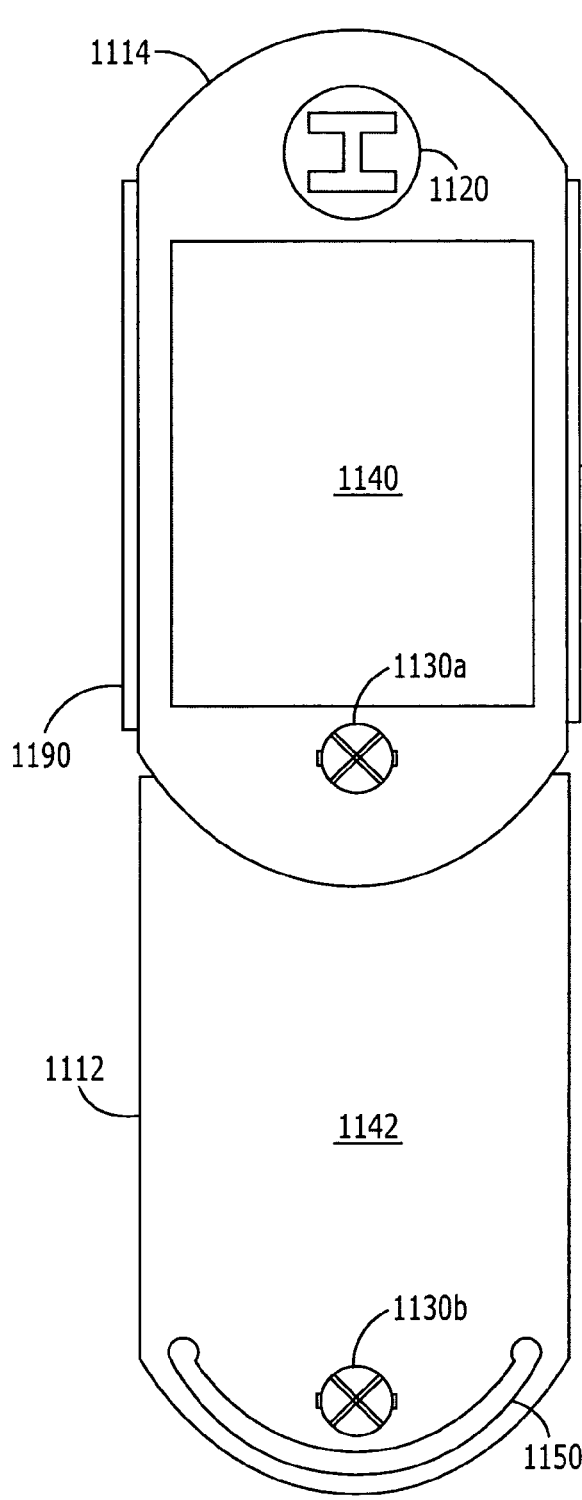
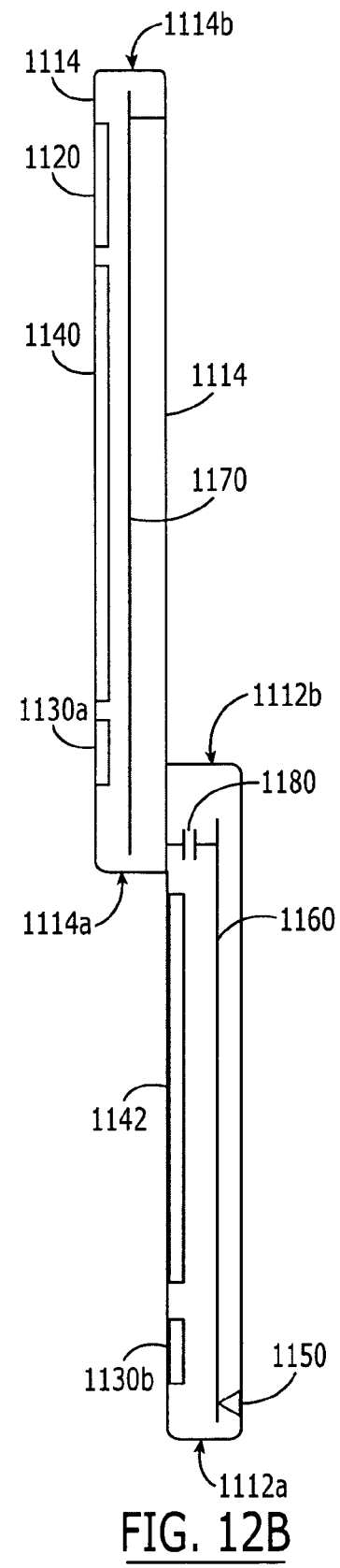
FIG. 12A
FIG. 12B

Frequency: 0.836 GHz    Gain in dBi

Tx pol: None    Rx pol: None

Magnitude (dB)
vs.
A-Azimuth (Deg)

HANDHELD WIRELESS COMMUNICATORS WITH REDUCED FREE-SPACE, NEAR-FIELD EMISSIONS

FIELD OF THE INVENTION

This invention relates to wireless communicators, and more particularly to handheld wireless communicators.

BACKGROUND OF THE INVENTION

Handheld wireless communicators (communication devices) are widely used for wireless voice, data and/or multimedia communications. As used herein, the term "handheld wireless communicator" means a wireless communicator that is small enough to be cradled in an average size human hand during operation. Handheld wireless communicators include conventional cell phones, smart phones that may include voice, video, text message, email and Web access capabilities, Personal Digital Assistants (PDA) with wireless communications capabilities, wireless pagers, Blackberry wireless handheld email devices, and handheld Personal Computers, but excludes conventional laptop computers. Handheld wireless communicators may have a total operational surface area of about 50 square inches or less, and may include a total display area of about 30 square inches or less. In particular, some smart phones may have a total operational surface area of about 20 square inches or less, and a total display area of about 12 square inches or less. For convenience, a handheld wireless communicator may also be referred to herein simply as a "phone".

Handheld wireless communicators may be classified based on the configuration of the housing thereof. In particular, a single piece housing may be provided in what is commonly referred to as a "stick phone". Two-piece housings also may be provided that are rotatably connected to one another in a "clamshell" or "jackknife" configuration, or are slidably coupled to one another in a "slider phone" configuration. These various types of housings have become ubiquitous for handheld wireless communicators, and need not be described in detail herein.

It may be desirable for a handheld wireless communicator to be hearing aid compatible. In fact, the hearing aid compatibility of certain devices has been mandated in the United States by the U.S. Federal Communications Commission (FCC). As is well known to those having skill in the art, hearing aid compatibility may be provided by reducing the free-space, near-field electric (E) and magnetic (H) field emissions toward the ear when the handheld wireless communicator is in use.

SUMMARY OF THE INVENTION

Handheld wireless communicators according to exemplary embodiments of the present invention include a housing having first and second opposing ends and an antenna adjacent the first end. A first ground plane is provided in the housing that extends from adjacent the first end to adjacent the second end, and is electrically connected to the antenna adjacent the first end. A second ground plane is provided in the housing that extends from adjacent the first end to adjacent the second end, and overlaps the first ground plane. A reactive element (i.e., comprising an inductor and/or capacitor) is provided in the housing adjacent the second end that reactively (i.e., inductively and/or capacitively) couples the first and second ground planes. A speaker is provided in the housing adjacent the second end. In some embodiments, the antenna is an internal antenna that is contained within the housing. In some embodiments, a microphone is provided in the housing adjacent the first end. Handheld wireless communicator configurations according to exemplary embodiments of the present invention may provide hearing aid compatibility and may also provide other potential advantages, such as reduced susceptibility to head blocking.

In some embodiments of the present invention, the housing includes first and second pieces, each having the opposing first and second ends described above, and a hinge therebetween at the second ends that rotatably couples the first and second pieces at the second ends to define a closed position of the housing wherein the first and second pieces are adjacent one another, and an open position of the housing wherein the second piece extends away from the first piece. In some embodiments, the antenna and the first ground plane are in the first piece, the second ground plane is in the second piece, and the reactive element is configured to reactively couple the first and second ground planes when the first and second pieces are rotated relative to one another from the open position to the closed position.

In some embodiments, the speaker is a first speaker in the second piece adjacent the second end, and a second speaker is also provided in the second piece adjacent the first end. In some embodiments, a microphone is provided in the first piece adjacent the first end. Moreover, in some embodiments, a display is provided in the housing between the first and second speakers. The display may be configured to display content at different orientations relative to the first and second speakers when the handheld wireless communicator is in the open position and in the closed position.

In jackknife embodiments, the first and second pieces each include opposing faces, and the hinge extends between the first and second pieces in a direction that is orthogonal to the opposing faces. The reactive element may be configured to reactively couple the first and second ground planes through the hinge when the first and second pieces are in the closed position. In clamshell embodiments, the hinge extends between the first and second pieces along the second ends. The first piece may include a first external contact and the second piece may include a second external contact that is arranged to touch or couple to the first external contact when the housing is in the closed position. In these embodiments, the reactive element may be configured to reactively couple the first and second ground planes through the first and second external contacts that touch or couple to one another in the closed position.

In slider phone embodiments, the housing includes first and second pieces each having the opposing first and second ends and a slide therebetween that slidably couples the first and second pieces to one another to define a closed portion of the housing wherein the first and second pieces are adjacent one another, and an open position of the housing wherein the second end of the first piece and the first end of the second piece are adjacent one another and the first end of the first piece and the second end of the second piece are remote from one another. In these embodiments, the antenna and the first ground plane may be in the first piece, the second ground plane may be in the second piece, and the reactive element may be configured to reactively couple the first and second ground planes when the first and second pieces are slid relative to one another from the open position to the closed position. Moreover, in some embodiments, a speaker may be provided in the second piece adjacent the second end and a microphone may be provided in the second piece adjacent the first end.

Handheld wireless communicators according to other exemplary embodiments of the invention include a multi-piece housing that is configured for movement between a closed position and an open position, and an antenna and a speaker in the housing at opposing ends thereof when the housing is in the closed position. A pair of ground planes may also be provided in the housing that are parallel to and closely spaced apart from one another in the housing when the housing is in the closed position, and are located between the antenna and the speaker when the housing is in the closed position. A reactive element also may be provided that is configured to reactively couple the pair of ground planes to one another when the housing is moved from the open position to the closed position. These exemplary embodiments may provide hearing aid compatibility when the housing is in the closed position. Hearing aid compatibility also may be provided when the housing is in the open position.

Still other embodiments of the present invention provide handheld wireless communicators that include a multi-piece housing that is configured for movement between a closed position and an open position. The housing includes opposing front and back faces when in the closed position. An antenna is provided that is connected to the housing and a speaker is provided in the housing that emits sound through the back face. The handheld wireless communicator is configured to radiate radio frequency signals from the antenna at about 850 MHz, with a ratio of radiation from the front face to radiation from the back face (commonly referred to as front-to-back ratio) of at least 5 dB when in the closed position. The multi-piece housing may be configured as a jackknife, clamshell or slider housing.

BRIEF DESCRIPTION OF THE DRAWINGS

FIGS. 1A and 1B are side cross-sectional and plan views, respectively, of handheld wireless communicators according to exemplary embodiments of the present invention.

FIGS. 5A and 5B are side cross-sectional and plan views, respectively, of jackknife handheld wireless communicators according to various embodiments of the present invention in a closed position.

FIGS. 11A and 11B are side cross-sectional and plan views, respectively, of slider handheld wireless communicators according to various embodiments of the present invention in a closed position.

FIGS. 12A and 12B are plan and side cross-sectional views, respectively, of slider handheld wireless communicators according to various embodiments of the present invention in an open position.

DETAILED DESCRIPTION

Figure 2A:
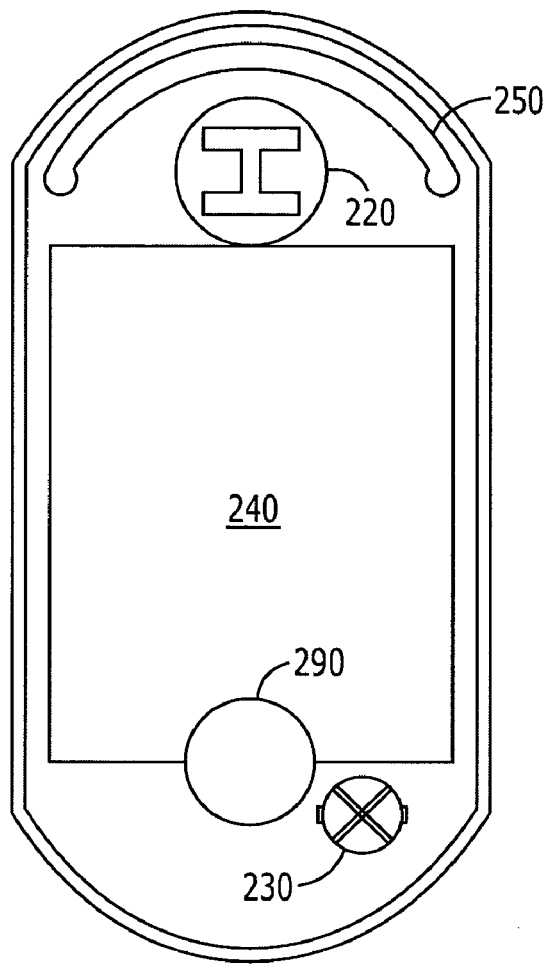
FIGS. 2A and 2B illustrate conventional jackknife handheld wireless communicators in closed and open positions, respectively.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, various dimensions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element, such as a layer or region, is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a wireless communicator. Conventionally, the face held against the ear is deemed the back, but the opposing outward face may also be deemed the back, depending on orientation.

Finally, as used herein, the term "adjacent" means close to or lying near, but not necessarily touching. Moreover, when the term "adjacent" is used herein relative to the first and second opposing ends of a housing or a housing piece, "adjacent" means closer to the given end than the opposing end. Thus, "adjacent the first end" means closer to the first end than to the second opposing end.

Embodiments of the present invention are described herein with reference to cross section illustrations that are schematic illustrations of idealized embodiments of the present invention. As such, variations from the shapes of the illustrations as a result of, for example, manufacturing techniques and/or tolerances and/or intentional design are to be expected. Thus, embodiments of the present invention should not be construed as limited to the particular shapes of regions illustrated herein but are to include deviations in shapes. For example, a housing region illustrated or described as flat may, typically, be rounded. Moreover, sharp angles that are illustrated, typically, may be rounded. Thus, the regions illustrated in the figures are schematic in nature and their shapes are not intended to illustrate the precise shape of a region and are not intended to limit the scope of the present invention unless expressly so defined herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIGS. 1A and 1B are side cross-sectional and plan views of handheld wireless communicators according to exemplary embodiments of the present invention. As shown in FIGS. 1A and 1B, these embodiments of handheld wireless communicators 100 include a housing 110 having first and second opposing ends 110a, 110b, respectively, a front face 110c and back face 110d. An antenna, such as an internal antenna 150, is contained within the housing adjacent the first end 110a. In other embodiments, an external antenna may be provided. A first ground plane 160 is provided in the housing 110 that extends from adjacent the first end 110a to adjacent the second end 110b, and is electrically connected to the antenna 150 adjacent the first end 110a. A second ground plane 170 is provided in the housing 110 that extends from adjacent the first end 110a to adjacent the second end 110b, and overlaps the first ground plane 160. A reactive element 180 (illustrated as a capacitor) is provided in the housing 110 adjacent the second end 110b that reactively couples the first and second ground planes 160, 170. It will be understood that non-reactive coupling, such as resistive coupling, also may be provided by the reactive element 180 and/or by a direct electrical connection between the first and second ground planes 160, 170. As also shown in FIG. 1, in other embodiments, a microphone 130 is provided in the housing 110 adjacent the first end 110a and a speaker 120 is provided in the housing 110 adjacent the second end 110b. As used herein, the term "speaker" is used to denote any electrical-to-acoustical transducer and the term "microphone" is used to indicate any acoustical-to-electrical transducer. It will be understood that a given device may function as both a speaker and a microphone in some embodiments.

Ground planes 160, 170 (and ground planes in subsequent figures) may be provided, according to embodiments of the present invention, by providing freestanding ground planes, by providing one or more ground planes in a printed circuit board or other mounting substrate, and/or by electrical connection to metallization of the housing using techniques that are well known to those having skill in the art. Moreover, the antenna 150 and antennas shown in other embodiments below, may be provided using any conventional antenna. In some embodiments, a Planar Inverted-F Antenna (PIFA) that is widely used for handheld wireless communicators, may be provided. The use of PIFA antennas including tunable parasitic resonators is described in application Ser. No. 10/864,761 to coinventor Vance, entitled *Tunable Parasitic Resonators*, the disclosure of which is hereby incorporated herein by reference in its entirety as if set forth fully herein. In some embodiments, the distance from the antenna 150 to the first end 110a can be between about 1 mm and about 40 mm and, in other embodiments, can be about 15 mm. Moreover, in some embodiments, the reactive element 180 and reactive elements described below, may have a capacitance of between about 2 pF and about 10 pF.

FIGS. 1A-1B described embodiments of the present invention wherein a one-piece housing is provided. Embodiments of the invention now will be described that include multi-piece (two or more piece) housings that may be coupled to one another in a jackknife, clamshell or slider configuration. In the description which follows, various embodiments of the present invention in jackknife, clamshell and slider configurations will be compared with conventional jackknife, clamshell and slider configurations of handheld wireless communicators.

Figure 2B:
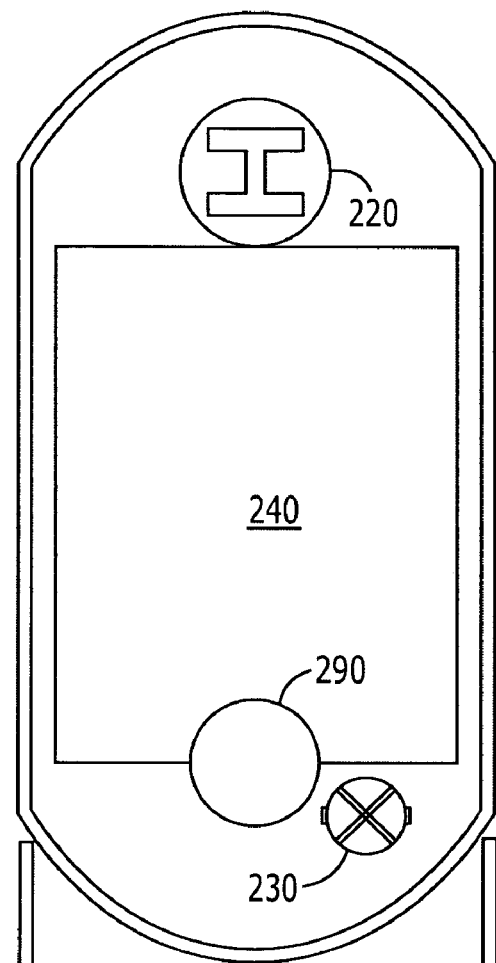
Figure 2B:
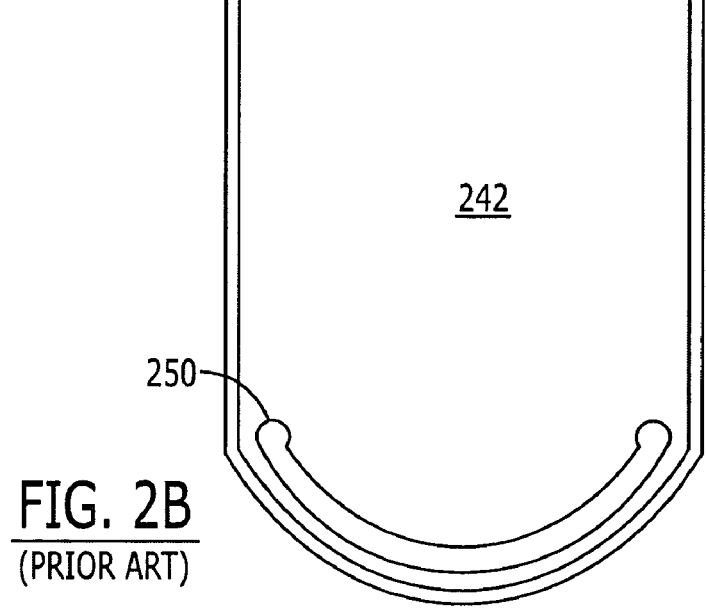

In particular, FIGS. 2A and 2B illustrate conventional jackknife handheld wireless communicators in a closed (FIG. 2A) and an open (FIG. 2B) position. The relative positions of a speaker 220, an antenna 250, a display 240, a keypad 242, a microphone 230 and a hinge 290 are also shown. In these configurations, the display 242 may be active in either the open state (FIG. 2B) or closed state (FIG. 2A), so that communications may be made and received in both states. The antenna 250 is at the top of the phone in the closed state (FIG. 2A), which can allow reduced hand detuning. The antenna is on the bottom in the open state (FIG. 2B), which can reduce head loading and/or head loss. Hot keys below the display (not shown in FIG. 2A or 2B) may be usable in both open and closed states.

Many stick-type phones may have free-space, near-field emissions above desirable levels by about 8 dB in the 850 MHz (cellular) band. While many clamshell phones, with ¼ wave antennas in the center of the phone, may have reduced free-space, near-field emissions in the PCS band, they may have higher than desired emissions in the cellular band (such as 8 dB above desired). Similarly, phones with the antenna on the bottom of the device may also have emissions which are above that which is desired.

When the free-space, near-field electric (E) and magnetic (H) emissions of a typical Jack-knife type phone, which includes an overall configuration of FIGS. 2A and 2B, is measured, the levels in Table 1 (shown as dB above desired levels) may be observed:

TABLE 1

| State | E-Field (850 Band) | H-Field (850 Band) | E-Field (1900 Band) | H-field (1900 band) |
|---|---|---|---|---|
| OPEN | 8.6 | 1.05 | 1.4 | 0.09 |
| CLOSED | 13.18 | 8.67 | 3.14 | 4.97 |

All values in the table indicate level in dB above the desired E and H field levels. Note that while the phone is close to the desired levels in the 1900 MHz band in the open state, it is more than 8 dB above the desired emissions levels in the 850 MHz band in either the open or closed states.

Figure 3:
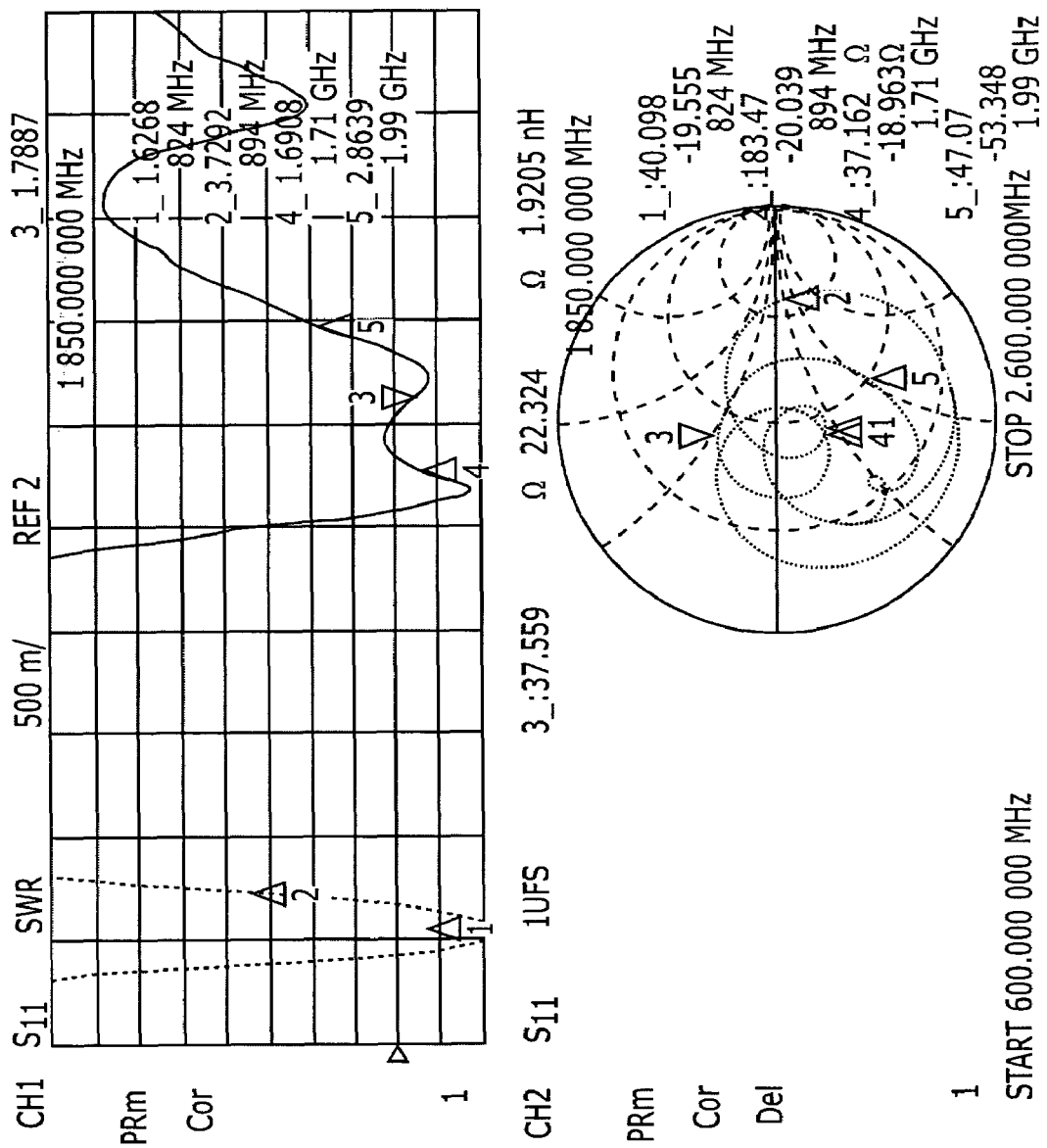
FIG. 3 graphically illustrates voltage standing wave ratio (VSWR) of a jackknife handheld wireless communicator in a closed state.

It is possible to make the antenna more directional in the closed state by adding matching to the hinge 290. For example, when using a matching capacitor value of 5.6 pF in a typical Jack-knife phone, the VSWR of FIG. 3 was observed in the closed state.

Figure 4A:
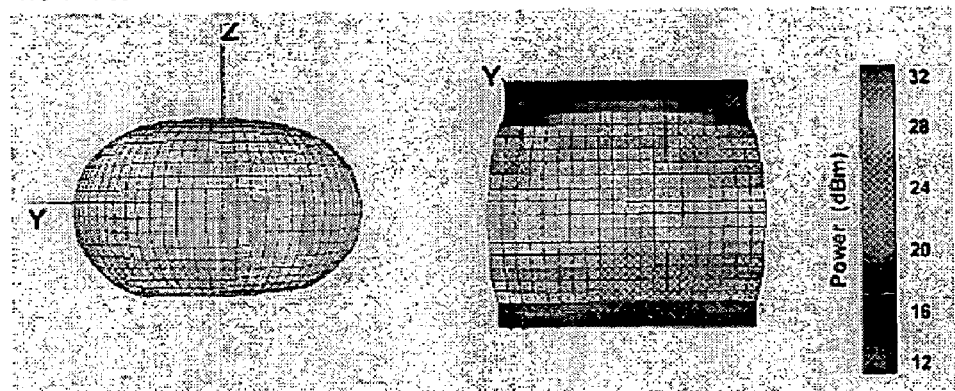
FIGS. 4A-4C graphically illustrate radiation patterns for various matching capacitor configurations that are applied to a jackknife handheld wireless communicator.
Figure 4B:
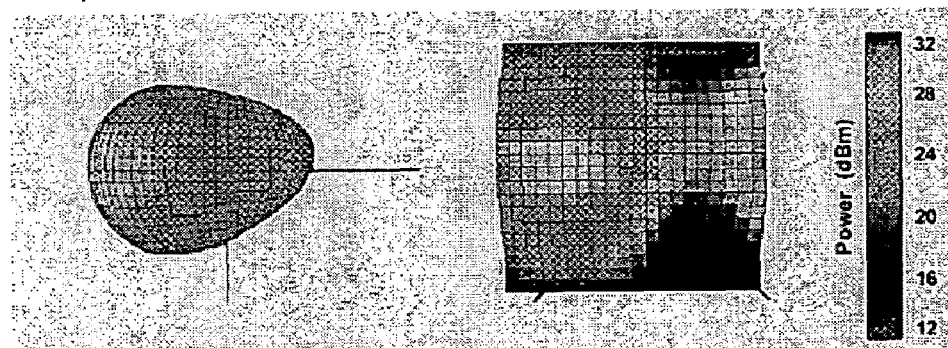
Figure 4C:
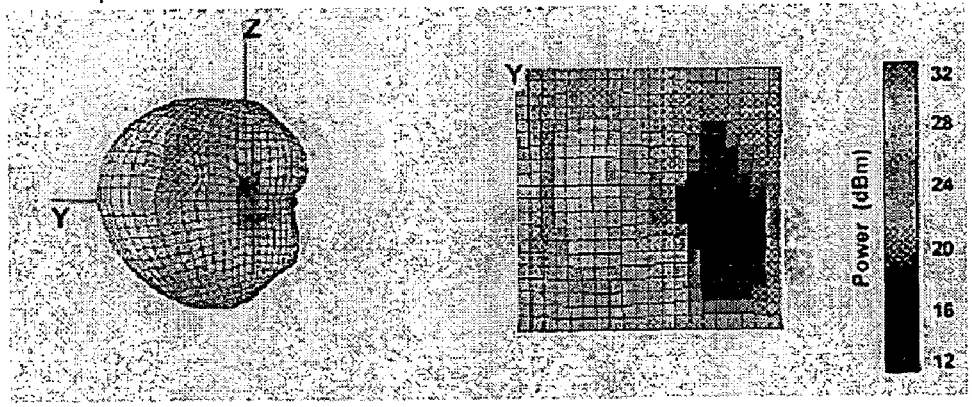

Note the dual resonance and impedance loop around 50 ohms at low-band (850 MHz). When radiation patterns are measured for the various matching capacitor configurations, radiation patterns of FIGS. 4A-4C may be obtained.

Thus, this reactive element matching can have the effect of greatly increasing directionality of the antenna without significantly impacting gain. In fact, it was noticed that free-space gain may drop slightly while user head gain may improve. See Table 2.

TABLE 2

| Test Case | No match | 6.8 pF | 5.6 pF | No match | 6.8 pF | 5.6 pF |
|---|---|---|---|---|---|---|
| 850 Band Average | Free-space | | | SAM Left | | |
| Tot. Rad. Pwr. (dBm) | 26.17 | 24.41 | 23.72 | 20.16 | 22.62 | 23.73 |
| Peak EIRP (dBm) | 28.79 | 28.09 | 28.72 | 26.88 | 27.65 | 28.65 |
| Directivity (dBi) | 2.62 | 3.71 | 5.01 | 6.72 | 5.02 | 4.93 |
| Front/Back Ratio (dB) | 1.65 | 6.67 | 10.29 | 12.40 | 10.43 | 10.56 |

The free-space, near-field emissions of various configurations were then measured with the results shown in Table 3 (shown as dB above desired):

TABLE 3

| | E-field (836) |
|---|---|
| Baseline | 10.59 |
| 6.8 pF | 8.76 |
| 5.6 pF | 8.65 |

Note that the baseline value shown in Table 3 of about 10.6 dB is different than that of the 13 dB shown in Table 2 because of a slightly different antenna configuration, set-up, and/or flip grounding. In either case, the baseline phone exceeds the desired emission levels in the closed state at low-band by at least about 10 dB.

The E-fields are high in the vicinity of the main antenna because this is the origin of the radiation of the phone. With this in mind, the phone was flipped and the results of Table 4 (shown in dB below desired) were observed:

TABLE 4

| Phone | Position | 850 E | 850 H | 1900 E | 1900 H | Overall |
|---|---|---|---|---|---|---|
| Jack-knife | Flipped | −1.15 | −3.07 | −0.73 | −0.33 | −0.33 |

Some embodiments of the invention may arise from a recognition that if a configuration can be provided with the antenna away from the speaker in the closed state, desired emission levels can be achieved in both bands. In the 850 band, a margin of 1 dB may be achieved which may provide an improvement of over 11 dB from the original configuration.

Figure 6A:
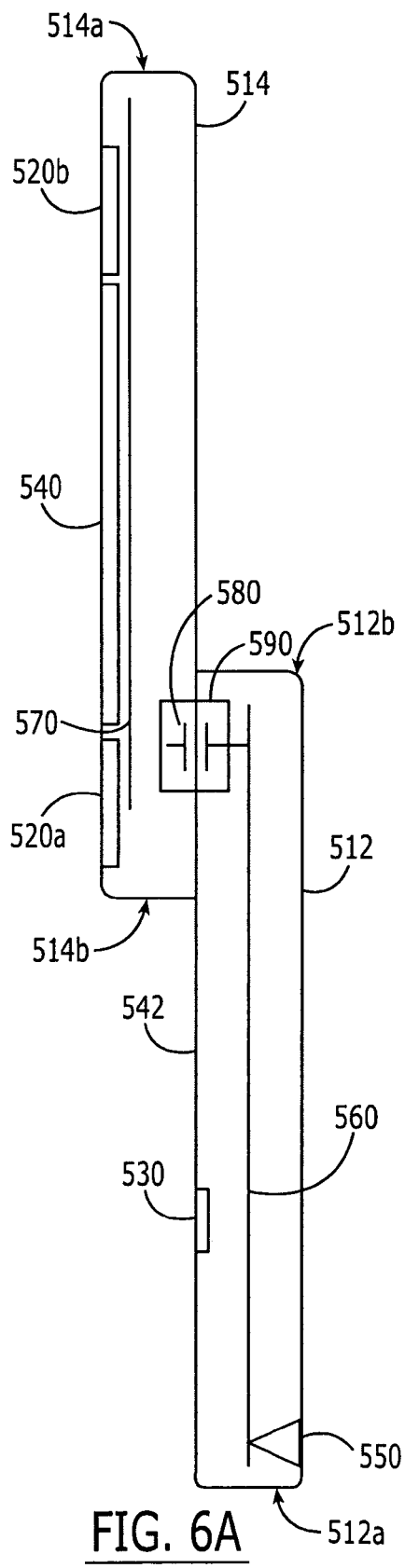
FIGS. 6A and 6B are side cross-sectional and plan views, respectively, of jackknife handheld wireless communicators according to various embodiments of the present invention in an open position.
Figure 6B:
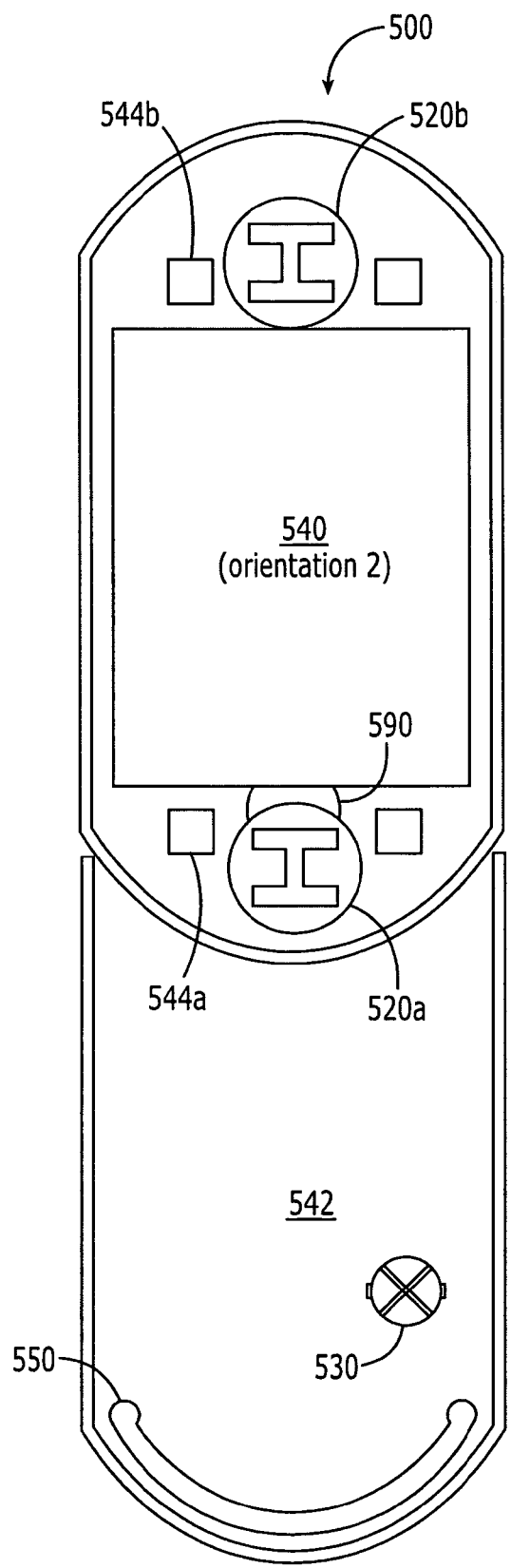

FIGS. 5A and 5B are side cross-sectional and plan views, respectively, of jackknife handheld wireless communicators according to exemplary embodiments of the present invention in a closed configuration. FIGS. 6A and 6B are side cross-sectional and plan views, respectively, of jackknife handheld wireless communicators according to exemplary embodiments of the present invention in an open configuration.

Referring now to FIGS. 5A, 5B, 6A and 6B, these embodiments of handheld wireless communicators 500 include a housing 510 having first and second opposing ends 510a and 510b. An internal antenna 550 is contained within the housing 510 adjacent the first end 510a. A first ground plane 560 is provided in the housing 510, extends from adjacent the first end 510a to adjacent the second end 510b, and is electrically connected to the antenna 550 adjacent the first end 510a. A second ground plane 570 is provided in the housing 510 that extends from adjacent the first end 510a to adjacent the second end 510b, and overlaps the first ground plane 560. A reactive element 580, such as a capacitor, is provided in the housing adjacent the second end 510b that reactively couples the first and second ground planes 560 and 570. Direct coupling also may be provided by a direct electrical connection between the first and second ground planes 560 and 570. A microphone 530 is provided in the housing 510 adjacent the first end 510a, and a speaker 520a is provided in the housing 510 adjacent the second end 510b.

Moreover, as shown in FIGS. 5A, 5B, 6A and 6B, the housing 510 comprises first and second pieces 512 and 514, respectively, each having the opposing first and second ends 512a, 514a and 512b, 514b, respectively. A hinge 590 is provided between the first and second pieces 512, 514, to define a closed position of the housing 510 (shown in FIGS. 5A and 5B), wherein the first and second pieces 512, 514 are adjacent one another, and an open position of the housing 510 (shown in FIGS. 6A and 6B), wherein the second piece 514 extends away from the first piece 512. As also shown in FIGS. 5A and 6A, the antenna 550 and the first ground plane 560 are in the first piece 512, the second ground plane 570 is in the second piece 514, and the reactive element 580 is configured to reactively couple the first and second ground planes 560, 570 when the first and second pieces 512, 514 are rotated relative to one another from the open position (FIGS. 6A and 6B) to the closed position (FIGS. 5A and 5B). In some embodiments, the reactive element 580 is configured to be disconnected from the first and second ground planes when the first and second pieces are in the open position, as shown by disconnection of the capacitive element in FIG. 6A.

As also shown in FIGS. 5A, 5B, 6A and 6B, in some embodiments, the speaker 520a is a first speaker 520a, and is provided in the second piece 514 adjacent the second end

514b, and a second speaker 520b is provided in the second piece 514 adjacent the first end 514a. Moreover, in some embodiments, a microphone 530 may be provided in the first piece 512a adjacent the first end 510a, and a display 540 may be provided in the housing, such as in the second piece 514 between the first and second speakers 520a, 520b. As also shown in FIGS. 5B and 6B, in some embodiments, the display 540 may be configured to display content at different orientations relative to the first and second speakers 520a, 520b when the handheld wireless communicator is in the open position (FIG. 6B) and in the closed position (FIG. 5B). For example, in some embodiments, the orientation of the display 540 may be rotated by 180°, so that the user views the content in the proper orientation when the handheld wireless communicator 500 is used in the open and closed positions. Moreover, as shown in FIG. 5A, in some embodiments, the hinge 590 extends between opposing faces of the first and second pieces 512, 514 in a direction that is orthogonal to the opposing faces. In some embodiments, the reactive element 580 may be configured to reactively couple the first and second ground planes 560, 570 through the hinge 590 when the first and second pieces 512, 514 are in the closed position, as shown in FIG. 5A. Matching of printed circuit boards by a reactive element through a hinge is described, for example, in Japanese Patent Application No. 2003-388099, filed Nov. 18, 2003 to Saito, the disclosure of which is hereby incorporated herein by reference in its entirety as if set forth fully herein.

Finally, still referring to FIGS. 5A-6B, a first key 544a may be provided between the display 540 and the first speaker 520a, and a second key 544b may be provided between the display 540 and the second speaker 520b. In some embodiments, the first and second keys 544a, 544b are duplicate keys that are configured to perform the same (fixed and/or variable) function, so that the same keys are provided below the display 540 regardless of the orientation of the display. It will be understood that, as used herein, the term "key" denotes a switch that is actuated by a user input. Various key technologies including movable keys or buttons, membrane keys capacitively coupled keys and/or touch screen keys may be used, as is well known to those having skill in the art, and the present invention is not limited to any particular key technology.

Additional discussion of embodiments of FIGS. 5A-6B now will be provided. In particular, as shown, two speakers 520a, 520b are used in some of these embodiments. The spacing is such that it may be possible to use these speakers for stereo sound in some cases. Also, the second speaker 520b can be used for speaker-hands free operations in the closed state of FIGS. 5A and 5B, while avoiding or reducing concern that the user will place this second speaker 520b near their head. The microphone 530 may port to the side of the housing in the closed state as illustrated in FIGS. 5A and 5B. This configuration may reduce or prevent the likelihood of the microphone port sealing to the cheek of the user. Also, as was described above, it may be desirable to flip the text and/or image on the display 540, depending on whether the handheld wireless communicator 500 is in the open or closed position. This inversion may be performed by software and/or hardware, using an open/closed detect switch to activate the state change. Moreover, the same fixed and/or variable function keys (also referred to as "hot keys") 544a, 544b may be provided on both ends of the display 540 if they are to be below the display in both use cases. These additional keys may also be used in some gaming applications, where the phone is held sideways in the closed state. When in the closed state, the display may also be reoriented 90° from its upright orientation to a sideways orientation for camera and/or gaming applications. This rotation may be performed manually, automatically upon entering a gaming or camera mode, and/or automatically by employing a tilt sensor and/or a low cost accelerometer. In some embodiments, delays may be provided so that the display would only rotate when it was actively being used (for example, a button pushed) and it was tilted in a direction for a set period of time.

Figure 7A:
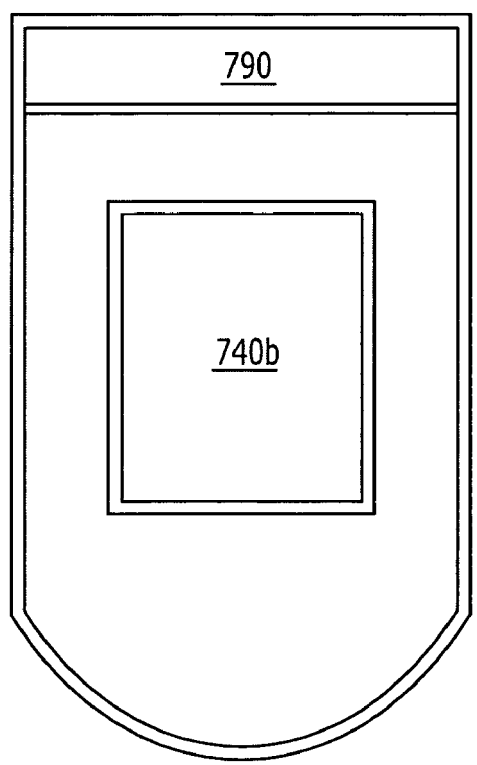
FIGS. 7A and 7B are plan views of conventional clamshell handheld wireless communicators in a closed and an open position, respectively.
Figure 7B:
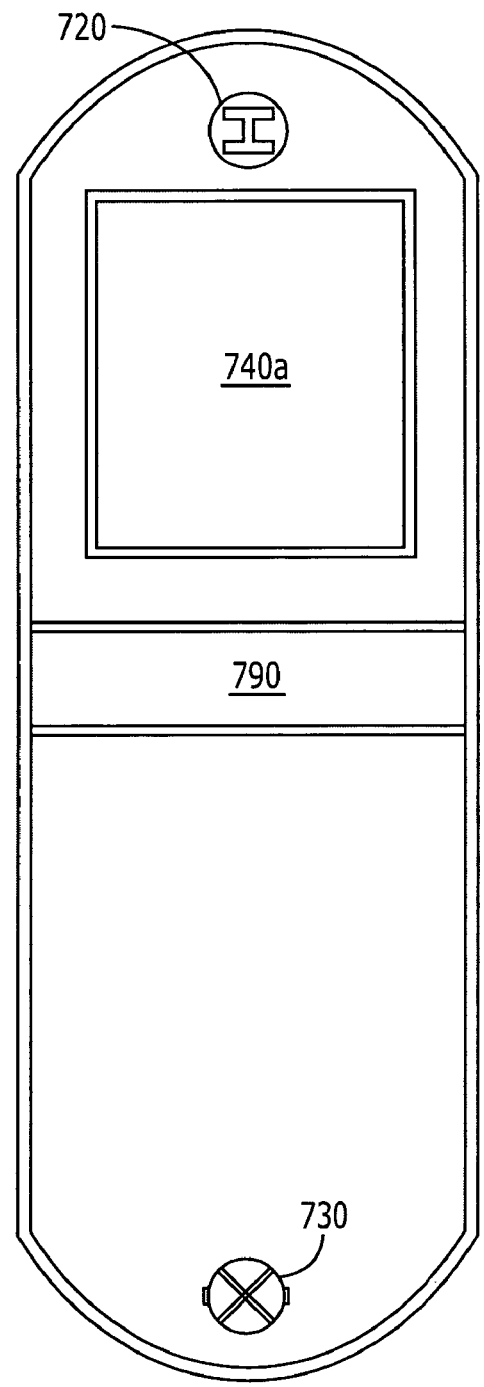

FIGS. 7A and 7B illustrate a conventional clamshell handheld wireless communicator in a closed (FIG. 7A) and an open (FIG. 7B) position. As shown in FIGS. 7A and 7B, a main display 740a and an exterior display 740b may be provided along with a hinge 790, a speaker 720 and a microphone 730. In some conventional clamshell phones, conversations may be made only in the open state. The antenna (not illustrated in FIGS. 7A or 7B) may be positioned in the center of the phone or at the bottom or top of the phone in the open state.

Figure 8A:
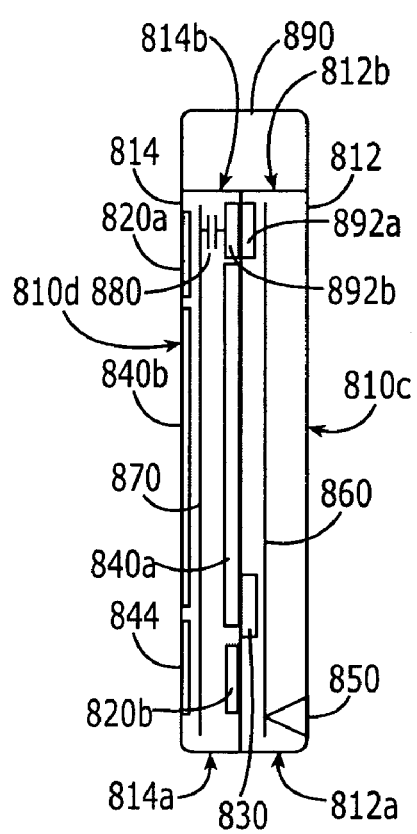
FIGS. 8A and 8B are side cross-sectional and plan views, respectively, of clamshell handheld wireless communicators according to various embodiments of the present invention in a closed position.
Figure 8B:
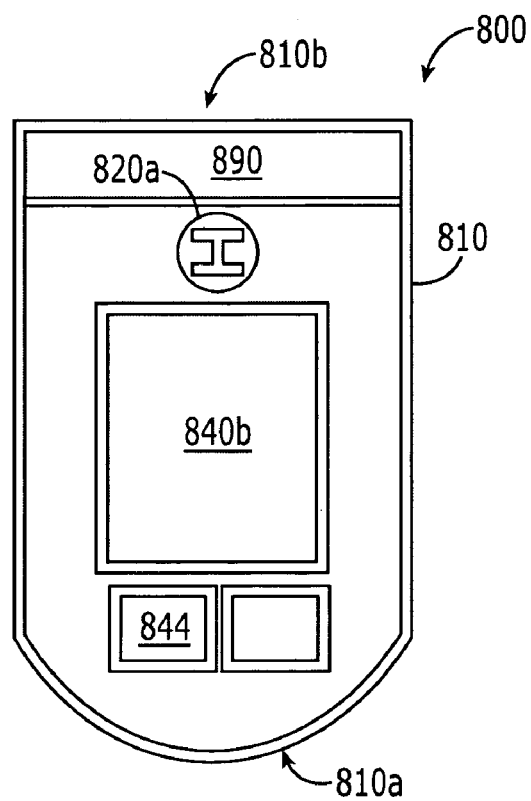
Figure 9A:
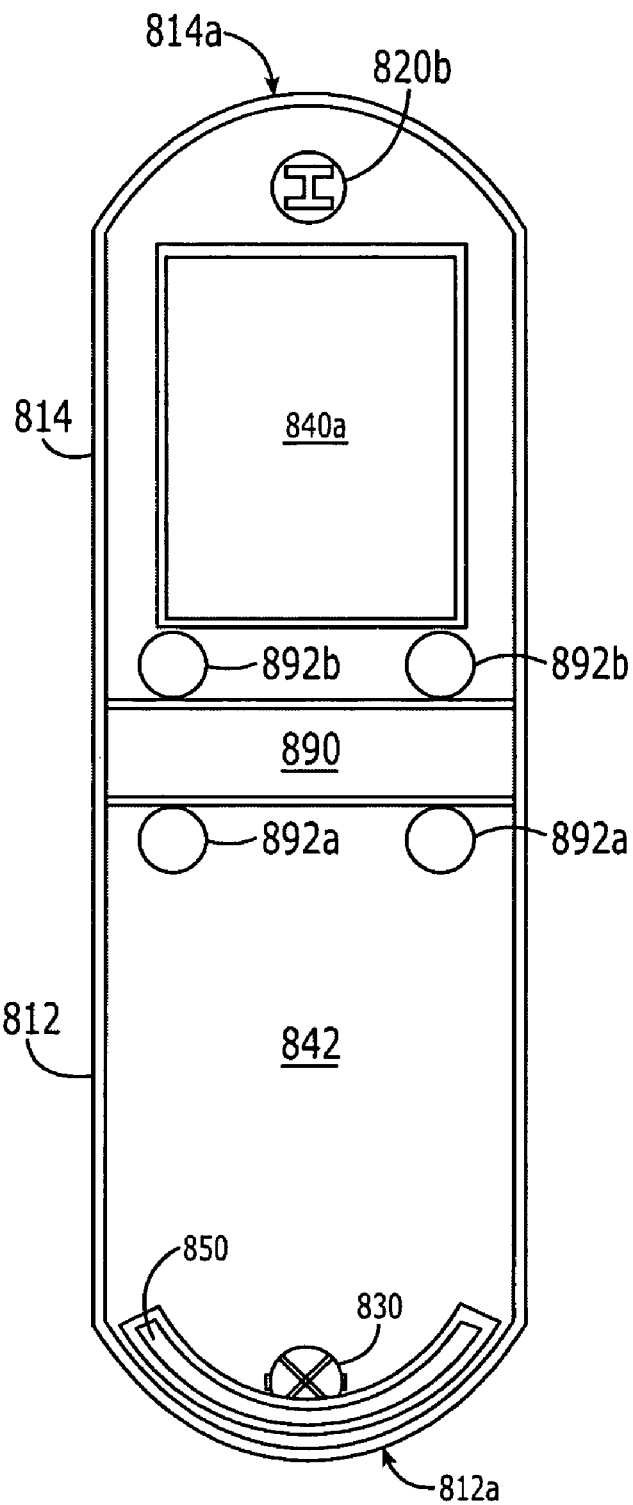
FIGS. 9A and 9B are plan and side cross-sectional views, respectively, of clamshell handheld wireless communicators according to various embodiments of the present invention in an open position.
Figure 9B:
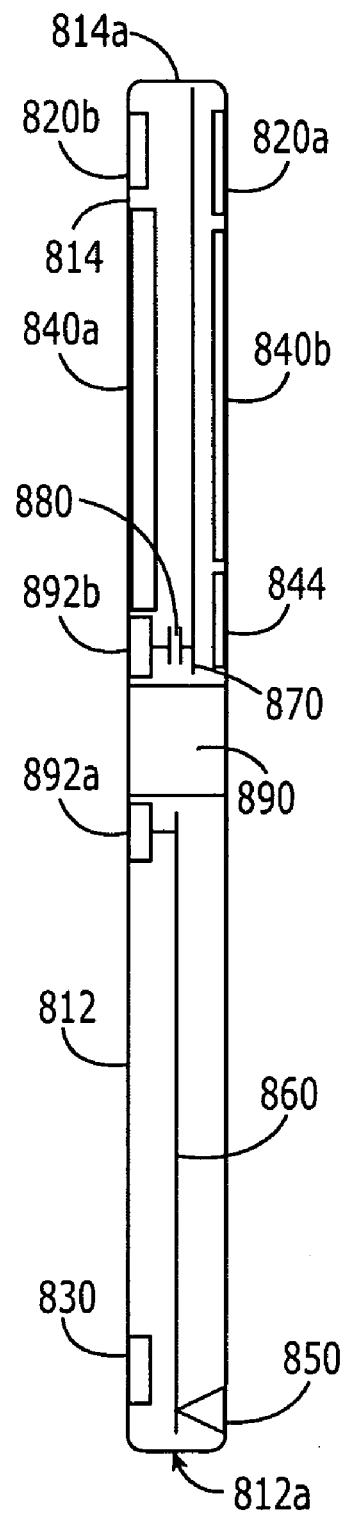

FIGS. 8A and 8B are side cross-sectional and plan views, respectively, of clamshell handheld wireless communicators in the closed state, and FIGS. 9A and 9B are plan and side cross-sectional views, respectively, of clamshell handheld wireless communicators in an open state, according to exemplary embodiments of the present invention. As shown in FIGS. 8A and 8B, these embodiments of handheld wireless communicators 800 include a housing 810 having first and second opposing ends 810a, 810b. An internal antenna 850 is contained within the housing 810 adjacent the first end 810a. A first ground plane 860 is provided in the housing 810, extends from adjacent the first end 810a to adjacent the second end 810b, and is electrically connected to the antenna adjacent the first end 810a. A second ground plane 870 is provided in the housing that extends from adjacent the first end 810a to adjacent the second end 810b, and overlaps the first ground plane 860. A reactive element 880, such as a capacitor, is provided in the housing 810 adjacent the second end 810b that reactively couples the first and second ground planes 860, 870. Direct coupling also may be provided. A microphone 830 also is provided in the housing 810 adjacent the first end 810a and a speaker 820b is provided in the housing adjacent the second end 810b.

Moreover, as also shown in FIGS. 8A-9B, the housing 810 includes first and second pieces 812 and 814, respectively, each having the opposing first and second ends 812a, 814a and 812b, 814b, respectively. A hinge 890 is provided therebetween at the second ends 812b, 814b that rotatably couples the first and second pieces 812 and 814 at the second ends 812b, 814b, to define a closed position of the housing 810 (FIGS. 8A and 8B), wherein the first and second pieces 812, 814 are adjacent one another, and an open position of the housing 810 (FIGS. 9A and 9B), wherein the first piece 812 extends away from the second piece 814. As also shown in FIGS. 8A-9B, the antenna 850 and the first ground plane 860 are in the first piece 812, the second ground plane 870 is in the second piece 814, and the reactive element(s) 880 is configured to reactively couple the first and second ground planes 860, 870 when the first and second pieces 812, 814 are rotated relative to one another from the open position (FIGS. 8A and 9B) to the closed position (FIGS. 8A and 8B).

As also shown in FIGS. 8A-9B, in some embodiments, a second speaker 820b is provided in the second piece 814 adjacent the first end 814a. A main display 840a is provided in the housing 810 between the first and second speakers 820a, 820b. The hinge 890 extends between the first and second pieces along the second ends 812b, 814b. In some embodiments, the first piece 812 includes a first external contact 892a, and the second piece 814 includes a second external contact 892b that is arranged to touch the first external contact 892*a* when the housing is in the closed position (FIGS. 8A-8B). A reactive element 880 is configured to reactively couple the first and second ground planes 860, 870 through the first and second external contacts 892*a*, 892*b* that touch one another in the closed position. The reactive element 880 may be contained in either housing 814 (shown) or 812 (not shown), or both. The reactance may be achieved either through a reactive element 880, or through the physical geometry of the contacts 892*a*, 892*b*, or both. In particular, it is well known that by designing the contacts 892*a*, 892*b* with a specific geometry, it may be possible to specify their capacitance. If the desired capacitance is achieved, the reactive element 880 may be removed from the circuit. In some cases, it may be desirable to add an additional resistive element to the reactive element to widen the bandwidth of the directional low-band resonator. This can make the phone directive in the cellular band over a wider range of frequencies, though the level of directivity may be somewhat reduced. Multiple first and second contacts also may be provided in some embodiments, as illustrated in FIGS. 8B and 9A.

Additional discussion of embodiments of FIGS. 8A-9B now will be provided. In particular, as shown in FIGS. 9A and 9B, the antenna 850 is placed at the bottom of the phone. Moreover, the phone is usable in the closed position (FIGS. 8A and 8B) for sending and receiving communications. The phone may have desired free-space, near-field emissions in both the 1900-MHz (PCS) band and the 850-MHz band, in the closed position shown in FIGS. 8A and 8B. It may also have reduced emissions in the 1900 band in the open position (FIGS. 9A and 9B), but may not have reduced emissions in the 850 band in the open state. For example, it may be 2-5 dB above the desired emission levels in the open state (based on simulations). As was also noted above, a set of external contacts 892*a*, 892*b* connect in the closed state. The external contacts may be matched for improved or optimum tuning and performance. The exterior display 840*b* may be useful in making and receiving calls. Hot keys 844 on the outside of the phone may be used for making and receiving calls. A speaker 820*a* may be placed on the outside of the phone. This outside speaker 820*a* can provide a speaker for an incoming call, but may also function as a microphone once the call is in progress. Since two speakers are commonly available in a conventional clamshell-type phone (i.e., one receiver and one speaker for the alert tones), the dual speakers of some embodiments of the present invention may not appreciably increase the cost.

Figures 10A, 10B:
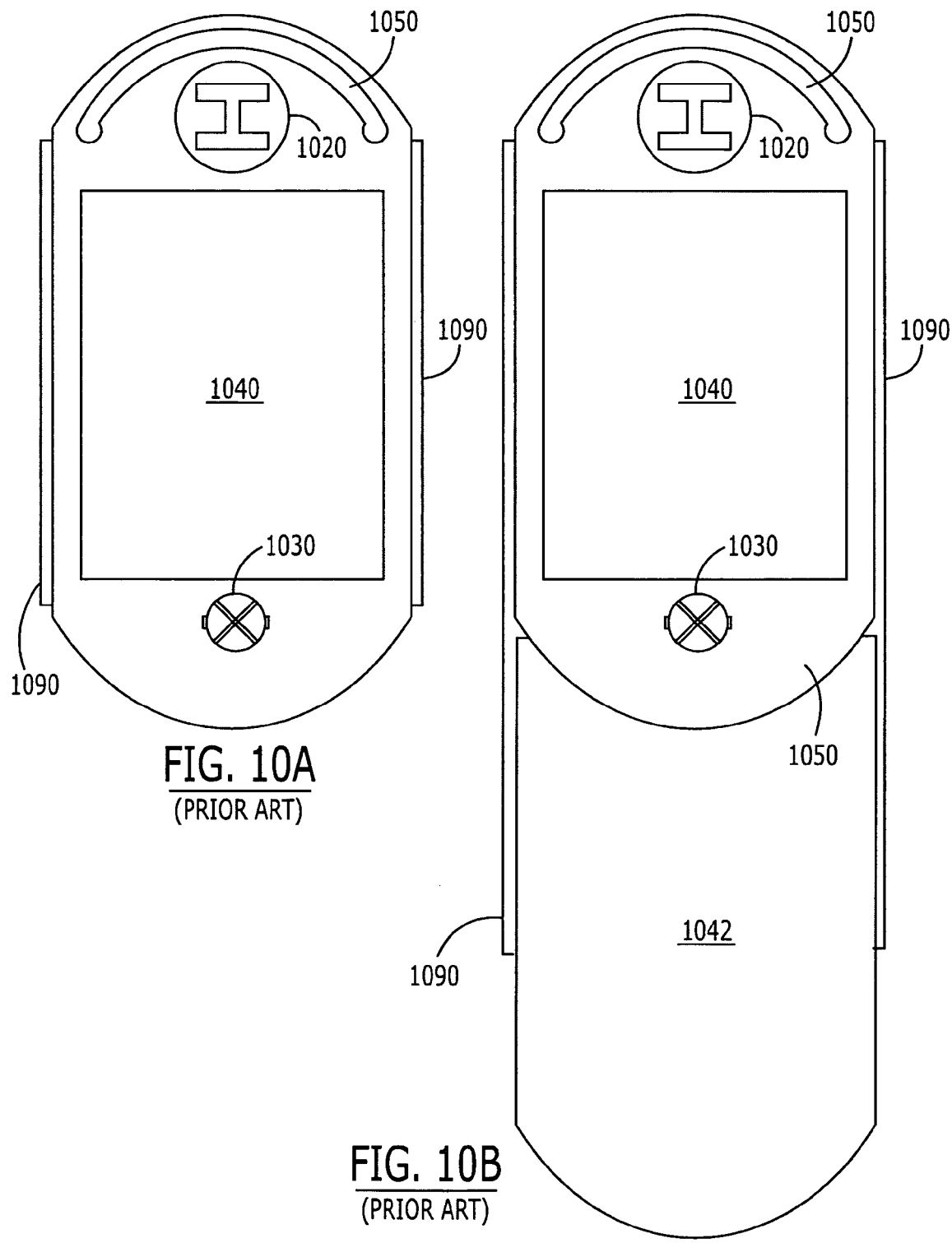
FIGS. 10A and 10B are plan views of conventional slider handheld wireless communicators in closed and open positions, respectively.

FIGS. 10A and 10B are top plan views of conventional slider phones. As shown in FIGS. 10A and 10B, a slider 1090 including a tongue-in-groove and/or other conventional slider configuration is used to slidably couple first and second pieces of a housing. The first piece includes a display 1040, speaker 1020, microphone 1030 and/or antenna 1050 while the second piece includes a keypad 1042. It will be understood that, as used herein, a keypad means multiple keys which may be alphanumeric keys.

FIGS. 11A and 11B are side cross-sectional and plan views, respectively, of exemplary slider phone embodiments of the present invention in the closed position, and FIGS. 12A and 12B are top plan and side cross-sectional views, respectively, of exemplary slider phone embodiments of the present invention in an open position. As shown in FIGS. 11A and 11B, these embodiments of handheld wireless communicators 1100 include a housing 1110 having first and second opposing ends 1110*a* and 1110*b*. An internal antenna 1150 is contained within the housing adjacent the first end 1110*a*. A first ground plane 1160 and a second ground plane 1170 are provided in the housing, and a reactive element 1180, such as a capacitor, is provided in the housing to reactively couple the first and second ground planes 1160, 1170. A first microphone 1130*a* is provided in the housing adjacent the first end 1110*a*, and a speaker 1120 is provided in the housing adjacent the second end 1110*b*. A display 1140 and a keypad 1142 also are provided.

More specifically, as illustrated in FIG. 11A, the housing 1110 comprises a first piece 1112 and a second piece 1114, each including opposing first ends 1114*a*, 1112*a*, and second ends 1112*b*, 1114*b*, and a slide 1190 between the first and second pieces 1112, 1114 that slidably couples the first and second pieces 1112, 1114 to one another, to define a closed position of the housing FIGS. (11A and 11B), wherein the first and second pieces are adjacent one another, and an open position (FIGS. 12A and 12B) of the housing wherein the second end 1112*b* of the first piece 1112 and the first end 1114*a* of the second piece 1114 are adjacent one another, and the first end 1112*a* of the first piece 1112 and the second end 1114*b* of the second piece 1114 are remote from one another. The antenna 1150 and the first ground plane 1160 are in the first piece 1112, the second ground plane 1170 is in the second piece 1114, and the reactive element 1180 is configured to reactively couple the first and second ground planes 1160, 1170 when the first and second pieces are slid relative to one another from the open position to the closed position. A second microphone 1130*b* may be provided in the first piece 1112 adjacent the first end 1112*a*. In other embodiments, two microphones 1130*a*, 1130*b* are not provided. Only one of these microphones may be provided, at either location.

As was described above, embodiments of the present invention may also provide handheld wireless communicators that include a multi-piece housing that is configured for movement between a closed position and an open position, an internal antenna contained within the housing and a speaker in the housing at opposing ends thereof when the housing is in the closed position. In some embodiments, a pair of ground planes may be provided in the housing that are parallel to and closely spaced apart from one another in the housing when the housing is in the closed position, and are located between the antenna and the speaker when the housing is in the closed position. A reactive element also may be provided that is configured to reactively couple the pair of ground planes to one another when the housing is moved from the open position to the closed position. The handheld wireless communicator may be hearing aid compatible when the housing is in the closed position. In some embodiments, desired free-space, near-field emissions may also be provided when the housing is in the open position.

Figure 13:
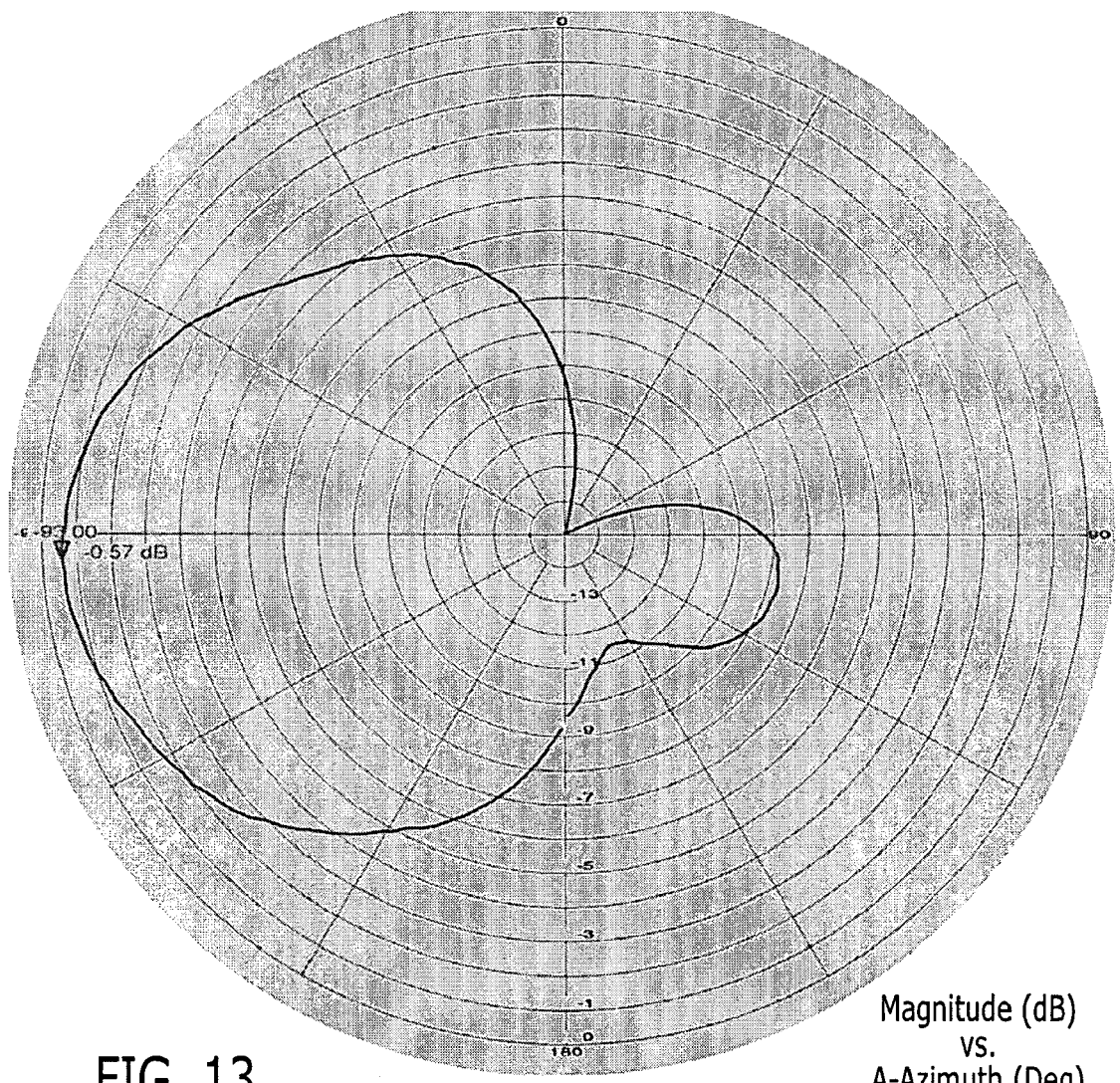
FIG. 13 graphically illustrates front-to-back radiation of a handheld wireless communicator at 836 MHz, according to embodiments of FIGS. 6A-6B.

Yet other embodiments of the present invention as illustrated in FIGS. 5A-6B, 8A-9B and 11A-12B provide handheld wireless communicators that include a multi-piece housing that is configured for movement between a closed position and an open position. The housing includes opposing front and back faces when in the closed position. An internal antenna is contained within the housing, and a speaker is provided in the housing that emits sound through the back face. The handheld wireless communicator is configured to radiate radio frequency signals from the antenna at about 850 MHz, with a ratio of radiation from the front face to radiation from the back face (commonly referred to as a front-to-back ratio) of at least 5 dB in the closed position. For example, FIG. 13 graphically illustrates measured front-to-back radiation at 836 MHz of embodiments of FIGS. 6A-6B in the closed position. A front-to-back ratio of about 8 dB is shown.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A handheld wireless communicator comprising:
   a housing having first and second opposing ends;
   an antenna adjacent the first end;
   a first ground plane in the housing that extends from adjacent the first end to adjacent the second end and is electrically connected to the antenna adjacent the first end;
   a second ground plane in the housing that extends from adjacent the first end to adjacent the second end and overlaps the first ground plane;
   a reactive element in the housing adjacent the second end that reactively couples the first and second ground planes; and
   a speaker in the housing adjacent the second end.

2. The handheld wireless communicator according to claim 1 wherein the antenna is an external antenna contained within the housing adjacent the first end.

3. A handheld wireless communicator according to claim 1 further comprising:
   a microphone in the housing adjacent the first end.

4. A handheld wireless communicator according to claim 1 wherein the housing comprises first and second pieces each having the opposing first and second ends and a hinge therebetween at the second ends that rotatably couples the first and second pieces at the second ends to define a closed position of the housing wherein the first and second pieces are adjacent one another and an open position of the housing wherein the second piece extends away from the first piece, wherein the antenna and the first ground plane are in the first piece. wherein the second ground plane is in the second piece and wherein the reactive element is configured to reactively couple the first and second ground planes when the first and second pieces are rotated relative to one another from the open position to the closed position.

5. A handheld wireless communicator according to claim 4 wherein the speaker is a first speaker in the second piece adjacent the second end and wherein the handheld wireless communicator further comprises a second speaker in the second piece adjacent the first end.

6. A handheld wireless communicator according to claim 5 further comprising a microphone in the first piece adjacent the first end.

7. A handheld wireless communicator according to claim 6 further comprising a display in the housing between the first and second speakers.

8. A handheld wireless communicator according to claim 7 wherein the display is configured to display content at different orientations relative to the first and second speakers when the handheld wireless communicator is in the open position and in the closed position.

9. A handheld wireless communicator according to claim 8 wherein the first and second pieces each includes opposing faces, wherein the hinge extends between the first and second pieces in a direction that is orthogonal to the opposing faces and wherein the reactive element is configured to reactively couple the first and second ground planes through the hinge when the first and second pieces are in the closed position.

10. A handheld wireless communicator according to claim 8 further comprising a first key in the housing between the display and the first speaker and a second key in the housing between the display and the second speaker.

11. A handheld wireless communicator according to claim 10 wherein the first and second keys are duplicate keys.

12. A handheld wireless communicator according to claim 8 wherein the display is configured to display content at two different orientations relative to the first and second speakers when the terminal is in the closed position in response to two different orientations of the housing.

13. A handheld wireless communicator according to claim 4 wherein the first and second pieces each includes opposing faces, wherein the hinge extends between the first and second pieces in a direction that is orthogonal to the opposing faces and wherein the reactive element is configured to reactively couple the first and second ground planes through the hinge when the first and second pieces are in the closed position.

14. A handheld wireless communicator according to claim 4 wherein the hinge extends between the first and second pieces along the second ends, wherein the first piece includes a first external contact and the second piece includes a second external contact that is arranged to touch the first external contact when the housing is in the closed position and wherein the reactive element is configured to reactively couple the first and second ground planes through the first and second external contacts that touch one another in the closed position.

15. A handheld wireless communicator according to claim 4 wherein the hinge extends between the first and second pieces along the second ends, wherein the first piece includes a first external contact and the second piece includes a second external contact that is arranged to couple to the first external contact when the housing is in the closed position and wherein the contacts are configured to reactively couple the first and second ground planes through the first and second external contacts that couple in the closed position.

16. A handheld wireless communicator according to claim 1 wherein the housing comprises first and second pieces each having the opposing first and second ends and a slide therebetween that slidably couples the first and second pieces to one another to define a closed position of the housing wherein the first and second pieces are adjacent one another and an open position of the housing wherein the second end of the first piece and the first end of the second piece are adjacent one another and the first end of the first piece and the second end of the second piece are remote from one another, wherein the antenna and the first ground plane are in the first piece, wherein the second ground plane is in the second piece and wherein the reactive element is configured to reactively couple the first and second ground planes when the first and second pieces are slid relative to one another from the open position to the closed position.

17. A handheld wireless communicator according to claim 16 further comprising a speaker in the second piece adjacent the second end and a microphone adjacent the first end.

18. A handheld wireless communicator according to claim 17 further comprising a display in the second piece between the speaker and the first microphone.

19. A handheld wireless communicator comprising:
   a multi-piece housing that is configured for movement between a closed position and an open position;
   an antenna and a speaker in the housing at opposing ends thereof when the housing is in the closed position;
   a pair of ground planes in the housing that are parallel to and closely spaced apart from one another in the housing when the housing is in the closed position and are located between the antenna and the speaker when the housing is in the closed position; and
   a reactive element that is configured to reactively couple the pair of ground planes to one another when the housing is moved from the open position to the closed position.

* * * * *

UNITED STATES PATENT AND TRADEMARK OFFICE
CERTIFICATE OF CORRECTION

PATENT NO. : 7,526,326 B2  Page 1 of 1
APPLICATION NO. : 11/128652
DATED : April 28, 2009
INVENTOR(S) : Vance et al.

It is certified that error appears in the above-identified patent and that said Letters Patent is hereby corrected as shown below:

Col. 13-14

Claims 2-18: the phrase "A handheld wireless communicator according to" has been changed to -- The handheld wireless communicator according to --

Signed and Sealed this

Thirtieth Day of June, 2009

JOHN DOLL
*Acting Director of the United States Patent and Trademark Office*